United States Patent
Fisher et al.

(10) Patent No.: US 7,420,961 B2
(45) Date of Patent: Sep. 2, 2008

(54) DISTRIBUTED MODEM

(76) Inventors: Abraham Fisher, 15 Harofeh Street, Haifa 34367 (IL); Oren Somekh, Moshav Beit Shearim, D.N. Emek-Israel 30046 (IL)

( * ) Notice: Subject to any disclaimer, the term of this patent is extended or adjusted under 35 U.S.C. 154(b) by 1107 days.

(21) Appl. No.: 10/311,189

(22) PCT Filed: Jun. 11, 2001

(86) PCT No.: PCT/IL01/00531

§ 371 (c)(1), (2), (4) Date: Dec. 13, 2002

(87) PCT Pub. No.: WO01/97499

PCT Pub. Date: Dec. 20, 2001

(65) Prior Publication Data

US 2003/0185230 A1    Oct. 2, 2003

(30) Foreign Application Priority Data

| Jun. 14, 2000 | (IL) | ................................. 136775 |
| Aug. 13, 2000 | (IL) | ................... PCT/IL00/00492 |
| Jan. 4, 2001 | (IL) | ................................. 140734 |
| Jan. 17, 2001 | (IL) | ................................. 140952 |
| Mar. 1, 2001 | (IL) | ................................. 141753 |
| Apr. 20, 2001 | (IL) | ................................. 142379 |
| May 21, 2001 | (IL) | ................... PCT/IL01/00455 |

(51) Int. Cl.
H04L 12/64 (2006.01)
H04M 11/06 (2006.01)

(52) U.S. Cl. ........................ 370/352; 370/389

(58) Field of Classification Search ................ 370/494, 370/352–356, 389
See application file for complete search history.

(56) References Cited

U.S. PATENT DOCUMENTS 5,546,388 A    8/1996    Lin (Continued)

FOREIGN PATENT DOCUMENTS

WO    WO 99/38351    7/1999

(Continued)

OTHER PUBLICATIONS

"A Digital Modem and Analogue Modem Pair for Use on the Public Switched Telephone Network (PSTN) at Data Signalling Rates of Up To 56 000 BIT/S Downstream and Up To 33 600 BIT/S Upstream"; ITU-T V. 90; Sep. 1998; pp. 1-50.

(Continued)

*Primary Examiner*—Min Jung

(57) ABSTRACT

A method of transmitting data bits over a modem connection. The method includes receiving a first stream of data bits, by a first modem, performing a first set of one or more communication tasks on the first stream of bits, by the first modem, so as to generate a second stream of bits, modulating the second stream of bits, by the first modem, so as to form a modulated signal, transmitting the modulated signal from the first modem to a second modem, demodulating the modulated signal by the second modem, so as to form a third stream of bits, performing on the third stream of bits, a second set of zero or more communication tasks, including a different number of tasks than the first set of tasks, so as to form a fourth stream of bits, and transmitting the fourth stream of bits to a communication unit over a packet based network.

54 Claims, 3 Drawing Sheets

U.S. PATENT DOCUMENTS

| | | | |
|---|---|---|---|
| RE35,740 E | | 3/1998 | Piasecki et al. |
| 5,790,641 A | | 8/1998 | Chan et al. |
| 6,044,107 A | * | 3/2000 | Gatherer et al. ............. 375/222 |
| 6,069,879 A | | 5/2000 | Chatter |
| 6,301,229 B1 | * | 10/2001 | Araujo et al. ............... 370/252 |
| 6,360,075 B1 | | 3/2002 | Fischer et al. |
| 6,434,169 B1 | | 8/2002 | Verreault |
| 6,446,232 B1 | * | 9/2002 | Chan et al. .................. 714/746 |
| 6,522,640 B2 | * | 2/2003 | Liebenow ................... 370/338 |
| 6,646,998 B1 | | 11/2003 | Räsänen |
| 6,667,986 B1 | * | 12/2003 | Sullivan et al. ............. 370/420 |
| 6,711,704 B1 | | 3/2004 | Tezuka |
| 6,757,250 B1 | | 6/2004 | Fayad et al. |
| 6,934,325 B2 | * | 8/2005 | Maytal ....................... 375/222 |
| 2002/0082047 A1 | * | 6/2002 | Souissi et al. ............... 455/557 |
| 2002/0133528 A1 | * | 9/2002 | Zolti et al. .................. 709/100 |
| 2003/0123466 A1 | * | 7/2003 | Somekh et al. ............. 370/401 |

FOREIGN PATENT DOCUMENTS

| | | |
|---|---|---|
| WO | WO 99/38352 | 7/1999 |
| WO | WO 99/39530 | 8/1999 |
| WO | WO 99/40685 | 8/1999 |
| WO | WO 00/11843 | 3/2000 |
| WO | WO 01/01654 | 1/2001 |
| WO | WO 01/35228 | 5/2001 |
| WO | WO 01/60008 | 8/2001 |
| WO | WO 01/91506 | 11/2001 |
| WO | WO 01/97503 | 12/2001 |

OTHER PUBLICATIONS

"Procedures for Starting Sessions of Data Transmission Over the Public Switched Telephone Network"; ITU-T V.8; Feb. 1998; pp. 1-13.

"Procedures for Real Time Group 3 Facsimile Communication Over IP-networks" ITU-T Recommendation T.38, Jun. 1998, pp. 1-30, XP002163782.

"A Modem Operating at Data Signalling Rates of Up to 33 600 BITS/S For Use on the General Switched Telephone Network and on Leased Point-To-Point 2-wire Telephone-Type Circuits"; ITU-T Recommendation V.34; Oct. 1996, XP002082229. pp. 1-4, 25-52.

Yu S -For, et al.; "A Multimedia Gateway for Phone/Fax and MIME Mail"; Computer Communications; vol. 20; No. 8; Aug. 25, 1997; XP004126715; pp. 615-627.

Gieseler S.: "Tunnelbau—Remote Access Server als Basis Fur Virtual Private Networks"; NET—Zeitschrift fuer, kommunikationsmanagment, Huthig Verlag; DE; vol. 52; No. 8/9; 1998; XP000782761; pp. 38-40.

Surf Communication Solutions Ltd., Comparison Between Possible Procedures For Real-Time Voice Band Modem Communication Over Packet Networks (MoIP), Nov. 9-10, pp. 1-4.

* cited by examiner

DISTRIBUTED MODEM

RELATED APPLICATIONS

The present application is a U.S. national filing of PCT Application No. PCT/IL01/00531, filed on Jun. 11, 2001.

FIELD OF THE INVENTION

The present invention relates to communication systems and in particular to systems which utilize modems.

BACKGROUND OF THE INVENTION

Transmission of data over telephone networks is commonly performed over Voice band modem (VBM) connections. At opposite ends of a VBM connection, modems translate data signals into voice signals and translate voice signals from the telephone network into data signals. The tasks of the modems are generally divided into a plurality of layers. From a top down view, a first layer performs data compression (DC) tasks. In transmission, the DC layer receives data bits and provides compressed data bits. In reception, the DC layer receives compressed data bits and provides uncompressed data bits. The compression is used to conserve bandwidth and is optional. The data compression is performed, for example, in accordance with the V.44 or V.42bis ITU recommendation or the MNP5 standard.

A second layer, referred to as an error correction (EC) layer, performs tasks which are generally divided into two modules, a link access procedure for modem (LAPM) module, and a high level data link control (HDLC) module. In transmission, the tasks of the LAPM module receive a stream of compressed bits (if compression is used), break the stream into frames and add to each frame a type, sequence number and an acknowledgment field. In reception, the LAPM tasks acknowledge the receipt of the frames and send the transmitting modem indications on the amount of unused space in the buffer of the receiving modem.

The tasks of the HDLC module, in transmission, add an error correction field (e.g., CRC) to the transmitted frames and pad the frame with flags (e.g., 0x7E bytes), according to the transmission rate of the modem, such that the number of bits transmitted in each time interval is constant. In reception, the HDLC module removes padding flags and the error correction field and discards frames with an erroneous CRC.

A third layer, referred to as a data pump (DP) layer, performs modulation and demodulation, i.e., converts data bits into voice symbols and vice versa.

Data transmitted on a VBM connection is generally handled in accordance with the DC layer, EC layer and DP layer by the transmitting modem and by the DP layer, EC layer and DC layer by the receiving modem. Thus, the same layers are applied at both end modems of the VBM connection, although the receiving modem substantially reverses the operations of the transmitting modem.

Although most modems perform the tasks of all three layers described above, the term modem covers apparatus which performs DP tasks even if the other tasks are not performed by the apparatus.

VBM connections may be established between client modems, which are connected to a PSTN through twisted pairs, between server modems which are connected directly to the infrastructure of the PSTN, or between a server modem and a client modem. The various connections may be established in accordance with various standards, such as the V.22, V.32, V.34, V.90, V.91 and V.92 ITU recommendations.

Some modems operate as a separate entity coupled to a computer or a computer network. Other modems comprise software which runs on a multi-purpose processor, such as a computer. There also exist reduced-hardware client modems which perform only some of the tasks of the modem. The remaining tasks are performed by a software running on a computer serviced by the modem. This reduces the price of the modem without adding too much load to the computer.

An array of modems, for example employed by an Internet service providers (ISP), is generally referred to as a modem remote access server (RAS). Some modem RAS servers employ processors which each handles a plurality of connections.

In many cases, the data transmitted over the modem connection is handled by the processors communicating over the connection, in accordance with the point to point protocol (PPP). For example, in communicating between a home computer and an ISP server, the home computer performs PPP tasks on data it is to transmit and passes the data to the modem. The modem then performs the DC, EC and DP tasks and transmits the data to a RAS of the ISP. The RAS reverses the DP, EC and DC tasks and passes the signals to the ISP server. The ISP server reverses the PPP tasks and passes the signals for further handling, for example in accordance with the TCP/IP protocol suite. It is noted that, generally, the tasks of the PPP protocol are not handled by the modems. The tasks of the PPP generally include correctness verification and compression.

In order to reduce the load on the telephone network due to VBM connections, an off-loading procedure has been introduced. In the off-loading procedure, a switch close to a calling modem identifies connections directed to ISPs and routes the connections to an adjacent off-loading gateway which terminates the connection (i.e., performs the DP, EC and DC tasks) and transfers the contents of the signals, in packets, to an off-loading interface box of the ISP, over a packet based connection. A leading off-loading proposal suggests that in addition to performing the modem tasks, the off-loading gateway perform a portion of the tasks of the PPP protocol, i.e., the HDLC tasks of the PPP protocol. In addition, an additional protocol, referred to as the L2TP protocol, is used for the transmission between the off-loading gateway and the interface box of the ISP. The L2TP protocol generally checks whether the off-loaded data signals are compressed and, if necessary, compresses the signals. This compression is generally computation intensive and adds to the cost of the off-loading modem. Even if compression is not required, e.g., the signals are already compressed in accordance with the PPP protocol, continuously checking that the signals are compressed is computationally intensive. On the other hand, transmitting the signals without compression is wasteful in bandwidth.

SUMMARY OF THE INVENTION

An aspect of some embodiments of the present invention relates to distributing the tasks of a remote access server for VBM connections between two or more units which are located in different geographical locations. Optionally, the two or more units are located in geographical locations which are separated by hundreds or thousands of meters or even hundreds or thousands of kilometers. In some embodiments of the invention, the two or more units include a front end unit which performs the data pump (P) tasks and optionally one or more other tasks, e.g., error correction (EC) tasks, and an upper layer unit which performs data compression (DC) tasks and optionally one or more other tasks, e.g., tasks not performed by the front end unit. Using this task distribution, the signals transmitted between the front end unit and the upper layer unit are already compressed, such that additional compression and decompression tasks, which are generally computationally intensive, are not required in the front end unit. The fact that the signals transmitted between the front end unit and the upper layer unit are compressed, is true even if one of the compressions of the DC modem layer and the PPP protocol are not used, as may be standardized in the future.

Performing the tasks of the remote access server (RAS) in a plurality of locations allows greater freedom in laying out apparatus of the RAS. For example, in some cases it is desired that modem connections be terminated as close as possible to the respective client modems, in order to conserve expensive switched telephone lines. In such cases, in accordance with embodiments of the invention, front end units which perform only some of the tasks of a modem RAS are positioned at a plurality of locations close to the client modems while the remaining tasks are performed by an upper layer unit at a central location. Thus, the volume and maintenance costs of the apparatus at the plurality of front end locations is reduced as they perform only some of the tasks. In addition, centralizing the handling of some of the tasks reduces the cost of the apparatus performing these tasks, as the utilization rate of apparatus at a central location is generally higher.

In some embodiments of the invention, distributing the tasks of a RAS may be used for Internet data off loading (IDOL). The off-loading units include only front end units (as described above) of a distributed RAS. The remaining tasks are performed by an upper layer unit (as described above) employed in an interface box of an Internet service provider (ISP).

In some embodiments of the invention, distributing the tasks of a RAS is performed by an Internet service provider, in order to provide signal termination close to the client modems on the one hand and concentration of the upper layer tasks on the other hand.

In some embodiments of the invention, the distribution of the tasks between the two or more units is adjusted dynamically. Optionally, at a specific time, the task distribution between the units for substantially all the handled connections, or for all the newly accepted connections, is the same. Alternatively, the task distribution for different connections may be different for different tasks.

Optionally, the task distribution is adjusted dynamically responsive to the load on the two or more units. For example, when a front end unit is close to its maximal capacity, the distribution is such as to require minimal computation power from the front end unit. When on the other hand, the load on the upper layer unit is high, the front end optionally takes upon itself a larger portion of the tasks.

An aspect of some embodiments of the present invention relates to distributing the tasks of a modem between two or more units which communicate through a packet based network, e.g., a wide area network (WAN), a metropolitan area network (NAN) and/or a local area network (LAN). Optionally, the packet based network comprises an IP network, a frame relay network and/or an ATM network.

An aspect of some embodiments of the present invention relates to a front end unit of a distributed modem that may operate with a plurality of different upper layer units. In some embodiments of the invention, in forming a connection, the front end unit is coupled with one of a plurality of upper layer units, for example, according to the telephone number dialed. Optionally, a single front end unit handles a plurality of VBM connections concurrently, which connections pass through different upper layer units.

An aspect of some embodiments of the present invention relates to managing a VBM connection with uneven layers of handling on the opposite sides of the connection. On a first end of the connection, the data pump tasks are performed with a set of one or more additional modem tasks while on a second end a different set including fewer modem tasks (optionally no tasks beyond the data pump tasks), is performed. The second end of the connection optionally comprises a gateway which forwards signals from the VBM connection over a non-VBM connection (e.g., a packet based connection) to an additional unit which is capable of handling partially terminated VBM signals. The additional unit may complete the termination of the partially terminated signals (i.e., perform the layer tasks performed by the first end but not by the second end) or may perform the same tasks as performed by the second end, in reverse, in order to transmit the signals over another VBM connection. In some embodiments of the invention, the second end of the VBM connection handles both connections for which the termination is completed by the additional unit and connections for which the additional unit reverses the tasks performed by the second end of the VBM connection. Optionally, the second end performs substantially the same tasks regardless of the tasks performed by the additional apparatus.

There is therefore provided in accordance with an embodiment of the invention, a method of transmitting data bits over a modem connection, comprising receiving a first stream of data bits, by a first modem, performing a first set of one or more communication tasks on the first stream of bits, by the first modem, so as to generate a second stream of bits, modulating the second stream of bits, by the first modem, so as to form a modulated signal, transmitting the modulated signal from the first modem to a second modem, demodulating the modulated signal by the second modem, so as to form a third stream of bits, performing on the third stream of bits, a second set of zero or more communication tasks, including a different number of tasks than the first set of tasks, so as to form a fourth stream of bits, and transmitting the fourth stream of bits to a communication unit over an addressable network.

Optionally, performing the first set of tasks comprises performing data compression tasks and the second set of tasks does not include data compression tasks. Optionally, performing the data compression tasks comprises performing compression tasks in accordance with the V.42bis protocol, the V.44 protocol or the MNP5 protocol. Alternatively or additionally, the first set of tasks does not include data compression tasks.

Optionally, the second set of tasks does not include LAPM tasks and/or HDLC tasks. Optionally, performing the second set of tasks comprises performing fewer tasks than in the first set of tasks. Optionally, the method includes performing, by the communication unit, on the fourth stream of bits a third set of tasks, including the tasks in the first set of tasks but not in the second set of tasks, by the communication unit. In some embodiments of the invention, the communication unit performs the second set of tasks on the fourth stream of bits so as to form a fifth stream of bits.

Optionally, the method includes modulating the fifth stream of bits so as to form an additional modulated signal and transmitting the additional modulated signal to a third modem which performs the first set of tasks on the additional modulated signal.

Optionally, transmitting the fourth stream of bits comprises transmitting on a non-switched network and/or on a packet based network. Possibly, the fourth stream of bits comprises at least one error correction field and/or padding flags. Optionally, transmitting the fourth stream of bits over a packet based network comprises transmitting over an IP network, a frame relay network and/or an ATM network. Optionally, the communication unit is distanced from the second modem by at least 100 meters. Optionally, the second modem is included in an off-loading unit. Optionally, the method includes encrypting the fourth stream of bits before it is transmitted to the communication unit.

There is further provided in accordance with some embodiments of the invention, a method of transmitting data bits over a modem connection, comprising receiving a first stream of data bits, by a first modem, performing a first set of one or more communication tasks on the first stream of bits, by the first modem, so as to generate a second stream of bits, modulating the second stream of bits, by the first modem, so as to form a modulated signal, transmitting the modulated signal from the first modem to a second modem, demodulating the modulated signal by the second modem, so as to form a third stream of bits, performing on the third stream of bits, a second set of zero or more communication tasks, including a different number of tasks than the first set of tasks, so as to form a fourth stream of bits, encrypting the fourth stream of bits, and transmitting the encrypted stream of bits to a communication unit.

Optionally, performing the first set of tasks comprises performing data compression tasks and the second set of tasks does not include data compression tasks.

There is further provided in accordance with some embodiments of the invention, a gateway for transferring voice band modem signals between a switched network and a packet based network, comprising a line interface adapted to receive modulated signals which represent data bits compressed by a modem in accordance with a modem compression standard, a modem which demodulates signals received by the line interface into a stream of bits which includes the data bits compressed by the modem, and a packet interface adapted to transmit the compressed data bits on a packet based network.

Optionally, the modem is adapted to remove a modem error correction field, padding flags and/or an acknowledgment field from the demodulated signals. Optionally, the packet interface is adapted to transmit the compressed data bits with an acknowledgment field and/or padding flags. Optionally, the packet interface is adapted to transmit the compressed data bits on an IP network and/or a frame relay network.

There is further provided in accordance with some embodiments of the invention, a gateway for transferring voice band modem signals between a switched network and a packet based network, comprising a line interface adapted to receive modulated signals which represent data bits which include an acknowledgment field of a modem standard, a modem which demodulates signals received by the line interface into a stream of bits which includes the acknowledgment field, and an addressable network interface adapted to transmit the stream of bits with the acknowledgment field on an addressable network. Optionally, the packet interface is adapted to transmit the stream of bits with padding flags.

There is further provided in accordance with some embodiments of the invention, a remote access server, comprising a front end unit adapted to perform one or more modem tasks, including a data pump task, on signals of one or more VBM connections, an upper layer unit adapted to perform for each of the one or more VBM connections one or more modem tasks not performed by the front end unit for the respective connection, and a packet link which transfers signals of the one or more connections between the front end unit and the upper layer link, encapsulated in packets.

Optionally, the front end unit performs a first set of one or more tasks on a first connection and a second set of one or more tasks, said second set being different from the first set, on a second one of the one or more tasks. Optionally, the tasks performed by the front end unit for substantially all the one or more connections are the same. In some embodiments of the invention, the tasks performed by the front end unit and the upper layer unit for each of the connections include at least a data pump task, and an EC task. Optionally, the upper layer unit performs a data compression task for at least one of the one or more connections.

In some embodiments of the invention, the tasks performed by the front end unit are selected responsive to the load on the front end unit and/or the upper layer unit. Optionally, the tasks performed by the front end unit are selected responsive to a quality measure of the packet link and/or the time at which the connection is established. In some embodiments of the invention, the packet link comprises an IP link. Optionally, the upper layer unit is distanced from the front end unit by at least 100 meters.

There is further provided in accordance with some embodiments of the invention, a method of forming a VBM connection, comprising receiving a request, from a requesting modem, to form a VBM connection, selecting a frond end unit to perform one or more modem tasks, including a data pump task, on signals of the VBM connection, selecting an upper layer unit, from a plurality of upper layer units which may operate with the selected front end unit, to perform one or more modem tasks not performed by the selected front end unit, on the signals of the VBM connection, and forming a connection between the requesting modem, the selected front end unit and the selected upper layer unit.

Optionally, selecting the upper layer unit comprises selecting responsive to a telephone number dialed by the requesting modem. Optionally, forming the connection comprises establishing a packet based connection between the selected front end unit and the selected upper layer unit. Possibly, forming the connection comprises establishing a delivery confirming packet based connection and/or a non-confirming packet based connection between the selected front end unit and the selected upper layer unit.

Optionally, the method includes instructing the front end unit which modem tasks to perform: Optionally, instructing the front end unit which modem tasks to perform comprises instructing responsive to the selected upper layer unit. Optionally, instructing the front end unit which modem tasks to perform comprises instructing responsive to the load on the selected front end unit. Optionally, the method includes instructing the upper layer unit which modem tasks to perform. In some embodiments of the invention, instructing the upper layer unit which modem tasks to perform comprises instructing responsive to the selected front end unit.

BRIEF DESCRIPTION OF FIGURES

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
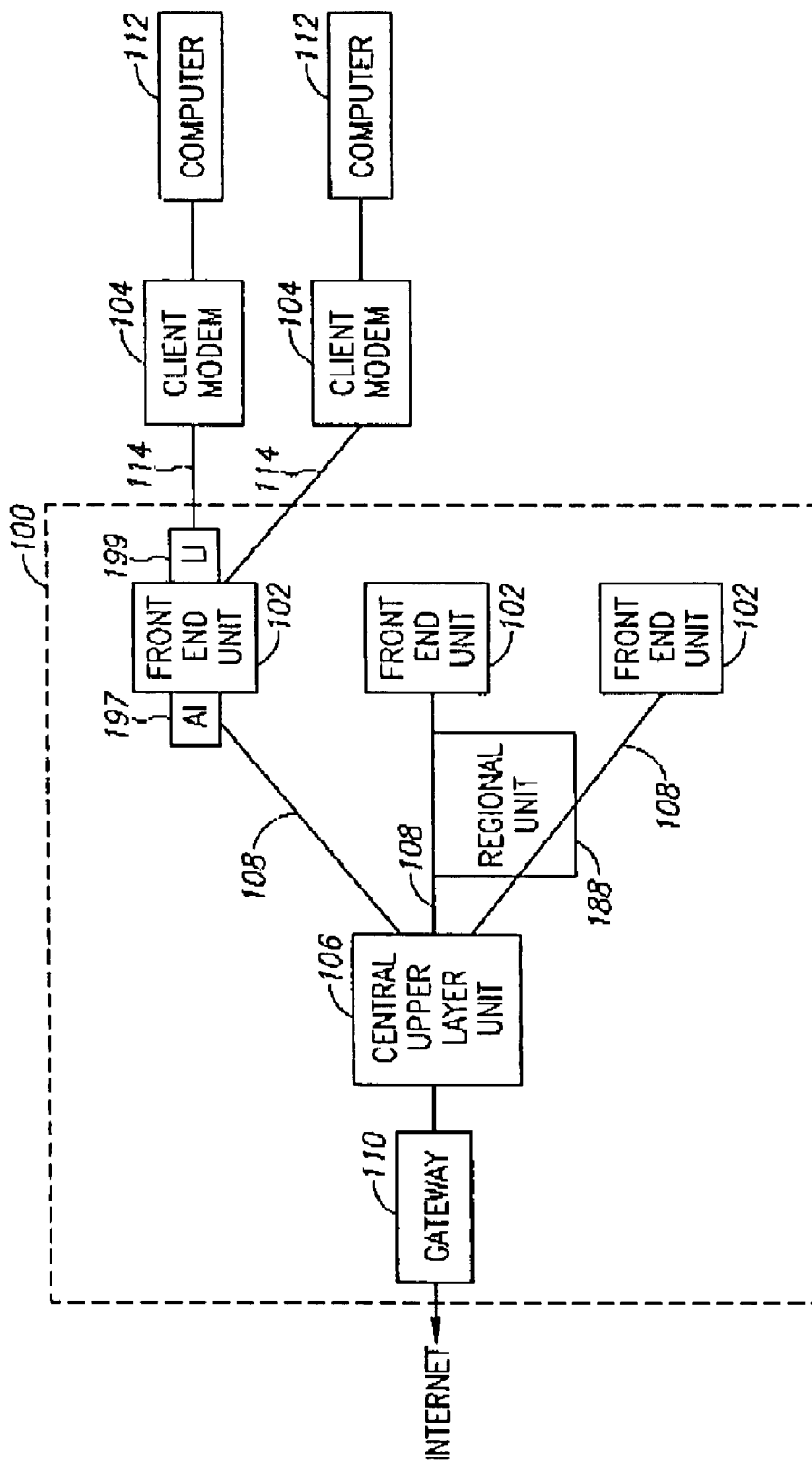
FIG. 1 is a schematic illustration of a distributed remote access server (RAS) system, in accordance with an embodiment of the present invention.

FIG. 1 is a schematic illustration of a distributed remote access server (RAS) system 100, in accordance with an embodiment of the present invention. System 100 comprises a plurality of front end units 102 located close to client modems 104, e.g., within the distance of a local area telephone call. Client modems 104 service, for example, computers 112 and/or other processors which connect through client modems 104 to a gateway 110 of RAS system 100. The connections between client modems 104 and front end units 102 generally pass over analog and/or digital telephone switched lines 114. A central upper layer unit 106, optionally leading to a public packet based network, e.g., the Internet, is connected to front end units 102 over communication links 108.

In some embodiments of the invention, front end unit 102 comprises a line interface (LI) 199 adapted to receive modulated signals which represent data bits compressed by a modem in accordance with a modem compression standard, from telephone switched line 114, and an addressable network interface (AT) 197 adapted to transmit the compressed data bits on communication link 108.

In some embodiments of the invention, communication links 108 comprise multi-point networks which connect three or more gateways and/or other communication units. Optionally, communication links 108 comprise addressable networks in which signals may be sent from a source to one or more of a plurality of destinations. Alternatively or additionally, one or more of communication links 108 comprises a dedicated point-to-point link connecting front end unit 102 and central unit 106. Optionally, when a dedicated link is used, addressing headers are not required and/or negotiation procedures between front end unit 102 and central unit 106 are not required as the parties to the connection are predetermined.

Optionally, communication links 108 comprise packet based networks, e.g., IP, frame relay or ATM networks. Alternatively or additionally, one or more of communication links 108 comprises any other type of link which is not a VBM link, including analog lines, digital paths (e.g., digital circuit multiplication equipment (DCME), SONET), high bandwidth synchronous links and combinations thereof. Communication links 108 may optionally be over physical wires, wireless links or a combination thereof.

Optionally, front end units 102 and central upper layer unit 106 may be separated by substantially any distance, including long distances of hundreds, thousands or tens of thousands of meters or even kilometers or even more, for example when communication links 108 include a satellite or other outer space transmission unit.

In some embodiments of the invention, the round trip transmission time of signals on communication links 108 between front end units 102 and central upper layer unit 106 may be greater than the shortest response time defined for modem negotiation signals in a protocol used to transmit signals between modems. It is noted that the distance between front end units 102 and central upper layer unit 106 may affect the specific embodiments (of those described below) used, due to the affect of the distance on the round trip delay of signals between client modems 104 and RAS system 100.

In some embodiments of the invention, client modem 104 comprises a standard modem which is not altered in order to perform the present invention. Furthermore, in some embodiments, client modem 104 does not know whether it is connected to a distributed RAS or to a regular, prior art, RAS.

As is known in the art, the signals transmitted between client modems 104 and front end units 102 may represent data bits to, or from, computer 112, or may comprise control signals of one of the layers of the VBM connection, i.e., data pump (DP), error correction (EC) or data compression (DC).

In some embodiments of the invention, front end unit 102 performs data pump (DP) tasks and upper layer unit 106 performs error correction (EC) and data compression (DC) tasks. Signals transmitted from client modem 104 which represent data bits are demodulated by front end unit 102 into data bits. The demodulated data bits are optionally encapsulated into packets and/or into any other format required by the communication link 108 connecting the front end unit 102 to upper layer unit 106. The encapsulated packets are optionally transmitted on a packet connection (e.g., UDP or TCP) on communication link 108 to upper layer unit 106. Upper layer unit 106 removes the encapsulation from the packets it receives and performs EC and DC tasks on the bits extracted from the packets.

Data bits transmitted to computer 112 are received by upper layer unit 106 through gateway 110. The received data bits are compressed by upper layer unit 106 in accordance with the DC layer tasks and error correction (EC) bits are annexed to the bits in accordance with the EC layer tasks. The compressed bits, along with the annexed EC bits, are then encapsulated into packets and transmitted over communication link 108 to front end unit 102. Front end unit 102 removes the encapsulation, modulates the bits and transmits the modulated data signals to client modem 104.

In some embodiments of the invention, front end unit 102 examines the contents of the signals passed to upper layer unit 106 to determine whether the signals include information. Alternatively or additionally, upper layer unit 106 examines the contents of the signals passed to front end unit 102. Signals which do not include information, i.e., signals which include padding sequences defined by modem recommendations, such as long sequences of "1" bits or idle ECDC 7E signals, are optionally discarded Optionally, all padding flags are discarded Alternatively, only padding sequences beyond a predetermined length, are discarded.

In some embodiments of the invention, the discarded padding flags are replaced by control packets, transmitted, for example, on a separate connection, which state the number and/or nature of the discarded bits so that the discarded signals are easily filled in by the receiving unit. Alternatively, control signals are not transmitted instead of the discarded signals and the missing signals are filled in based on the transmission rate on the VBM connection. By discarding signals which do not carry information, the load on link 108 is reduced allowing higher utilization rates of the link.

Front end unit 102 and client modem 104 exchange DP control signals as required by the standard governing the VBM connection. DP control signals transmitted to client modem 104 are generated by front end unit 102 and DP control signals from client modem 104 are handled by front end unit 102. In some embodiments of the invention, the DP control signals are generated by front end unit 102, independently, without receiving instructions and/or information from upper layer unit 106. Alternatively, upper layer unit 106 instructs front end unit 102 on the DP control signals it should transmit and/or provides front end unit 102 with information used in generating the DP signals.

In an exemplary embodiment of the invention, during a stage used to determine the round trip delay of the connection, e.g., the second stage of the V.34 negotiation, front end unit 102 does not respond at the prescribed time (e.g., after the prescribed 40 msec) to the signals it receives. Instead, front end unit 102 waits an additional time which represents the round trip delay period of signals on link 108 between front end unit 102 and upper layer unit 106 which calculates timeouts. Optionally, the additional wait time is a predetermined estimate of the delay of link 108. Alternatively, front end unit transmits a time measuring signal to upper layer unit 106 and the time between the transmission and receiving the response is used as the additional wait time. The time measuring signal may be transmitted before or after the signal to which front end unit 102 must respond, is received. Alternatively or additionally, the changes during the stage of determining the round trip delay are performed as described in Israel patent application 140,952, filed Jan. 17, 2001, the disclosure of which is incorporated herein by reference.

Optionally, EC and DC control signals are forwarded by front end unit 102 as if they are data bits, without front end unit 102 differentiating between data bits and the bits of EC and DC control signals. Alternatively, front end unit 102 recognizes EC and DC control signals received from client modem 104 and transmits their bits to upper layer unit 106 separately from the data bits, on the same connection used for data bits or on a different connection. Similarly, front end unit 102 optionally receives EC and DC control signals from upper layer unit 106 (for transmission to client modem 104), separately from data bits.

In some embodiments of the invention, the packet connections on link 108 are in accordance with a delivery confining protocol (e.g., TCP or a proprietary protocol above UDP), so that signals are generally not lost on their way between front end unit 102 and upper layer unit 106. Alternatively, the packet connections on link 108 are in accordance with a non-confirming protocol (e.g., UDP) which generally incurs less delay on the transmitted signals. Generally, mistakes which occur in the transmission will be corrected by the EC tasks performed by upper layer unit 106 and client modem 104. Further alternatively or additionally, a redundancy method, for example double transmission, is used for the exchange of data bits on link 108. Optionally, different redundancy methods are used for data bits and for control bits according to their importance. Alternatively, redundancy is used only for control signals or only for data bits. In some embodiments of the invention, additional protocols are applied to the signals transmitted on link 108. For example, the signals transmitted on link 108 may be encrypted, e.g., in accordance with the IPsec protocol, before they are transmitted, in order to prevent eavesdropping to the VBM connection.

Optionally, the RAS control signals exchanged between front end unit 102 and upper layer unit 106 are transmitted on the same packet connection as the data bits and/or EC and/or DC control signals. Alternatively or additionally, a separate control connection on communication link 108 or on a separate link is used to exchange RAS control signals and/or EC and/or DC control signals between front end unit 102 and upper layer unit 106. Substantially any agreed format may be used for the control signals exchanged between front end unit 102 and upper layer unit 106, for example a format similar to that described in the ITU T.38 recommendation. The separate control connection may be a delivery confirming connection or a non-confirming connection, with or without redundancy.

In some embodiments of the invention, front end unit 102 performs data pump (DP) and error correction (EC) tasks while upper layer unit 106 performs data compression (DC) tasks.

Signals, transmitted from client modem 104, which represent data, are demodulated by front end unit 102 into data bits. The demodulated data bits are then checked for errors according to error correction bits annexed thereto. If an error occurred, front end unit 102 requests a retransmission of the erroneous data from client modem 104. The error free data bits in their compressed form are encapsulated and forwarded to upper layer unit 106, using any of the encapsulation methods described above. In addition, any of the types of connections described above may be used for transmission of the data bits on link 108. It is noted, however, that the consequences of transmission errors on link 108 which are not handled by the connection on link 108, are less severe when the EC tasks are performed by upper layer unit 106. This is because the transmission errors on link 108 will be identified and handled by the EC tasks of the modem. Conversely, when the EC tasks are performed by front end unit 102, uncompensated errors on link 108 will only be identified, if at all, by an application or transport layer above the modem.

Data bits transmitted to computer 112 are received by upper layer unit 106 through gateway 110. The received data bits are compressed by upper layer unit 106 and are then encapsulated and transmitted to front end unit 102. Front end unit 102 removes the encapsulation, annexes error correction (EC) bits to the data bits in accordance with the EC layer tasks, modulates the bits and transmits the modulated data signals to client modem 104.

Front end unit 102 and client modem. 104 exchange DP control signals as described above. In addition, EC control signals are generated and handled by front end unit 102. On the other hand, DC control signals are forwarded by front end unit 102, with or without being aware of their being DC control signals.

In some embodiments of the invention, front end unit 102 and upper layer unit 106 handle their control signals independently, without receiving information and/or instructions from the other unit. Alternatively or additionally, one or more of units 102 and 106 receives information and/or instructions from the other unit and accordingly generates at least one of its control signals.

In some embodiments of the invention, front end unit 102 performs data pump (DP) and HDLC tasks while upper layer unit 106 performs LAPM and data compression (DC) tasks.

Signals transmitted from client modem 104 which represent data are demodulated by front end unit 102 into data bits. Padding flags and the CRC field are removed from the demodulated data bits, and erroneous frames are discarded. The resulting frames are encapsulated and forwarded to upper layer unit 106, using any of the encapsulation methods described above. Upper layer unit 106 acknowledges the receipt of the frames and exchanges flow control commands (e.g., retransmission requests, buffer full notices) with client modem 104. Upper layer unit 106 also decompresses the data bits extracted from the frames.

Data bits transmitted to computer 112 are received by upper layer unit 106 through gateway 110. The received data bits are compressed by upper layer unit 106 and are broken into frames to which flow control commands are annexed. The frames are encapsulated and transmitted to front end unit 102. Front end unit 102 removes the encapsulation, performs flag padding and adds a CRC field to the frames in accordance with the HDLC layer tasks. Front end unit 102 then modulates the bits and transmits the modulated data signals to client modem 104.

Front end unit 102 and client modem 104 exchange DP control signals as described above. Optionally, delay procedures as described above are used during the stage in which the round trip delay is measured. In addition, HDLC control signals are generated and handled by front end unit 102. On the other hand, LAPM and DC control signals are forwarded by front end unit 102, with or without being aware of their being DC control signals.

In some embodiments of the invention, front end unit 102 and upper layer unit 106 do not exchange any RAS control signals (i.e., signals used to coordinate the operations of the RAS between front end unit 102 and upper layer unit 106) except for signals for establishment and closing of packet connections. Alternatively, front end unit 102 and upper layer unit 106 exchange RAS control signals, for example to provide information and/or instructions from upper layer unit 106 to front end unit 102 regarding the generation of DP signals. Alternatively or additionally, the RAS control signals are used by front end unit 102 to indicate to upper layer unit 106 entering and/or exiting a data transmission mode and/or the transmission rate of signals in the DP layer. Further alternatively or additionally, the RAS control signals are used to notify front end unit in disconnect events and/or for flow control purposes between the units.

In some embodiments of the invention, a division of the tasks of RAS system 100 between front end unit 102 and upper layer unit 106 is performed dynamically. Optionally, upper layer unit 106 may operate with a plurality of front end units 102 which perform different tasks. At formation of a connection with a front end unit 102, upper layer unit 106 determines the tasks performed by the front end unit 102 and accordingly adjusts the tasks it is to perform. Alternatively or additionally, a front end unit 102 may operate with a plurality of different upper layer units 106 which perform different tasks. The tasks performed by front end unit 102 are adjusted according to the tasks performed by the upper layer unit 106.

Alternatively or additionally, the task division between front end unit 102 and upper layer unit 106 is chosen responsive to the load on front end unit 102 and/or on upper layer unit 106. In some embodiments of the invention, at formation of a connection between front end unit 102 and upper layer unit 106, the units exchange indications of their load and accordingly choose the task division to be used on the connection.

In an exemplary embodiment of the invention, front end unit 102 generally performs tasks having a maximal load, leaving upper layer unit 106 with a minimal processing load. Thus, upper layer unit 106, which services a larger number of potential users, is left with as much as possible free processing power. When front end unit 102 is close to its maximal power consumption, the front end unit 102 performs, optionally only on newly accepted connections, only a minimal set of tasks (e.g., only DP tasks).

In some embodiments of the invention, front end unit 102 manages a set of thresholds to which the processing load of front end unit 102 is compared. For example, if the load of front end unit 102 is above 50% of its processing power, front end unit 102 performs on a newly accepted connection only part of the EC tasks. If the load of front end unit 102 is above 75% of its processing power, front end unit 102 performs on the new connection only DP tasks. In some embodiments of the invention, at some load rates and/or for some connections, front end unit 102 may perform all the modem tasks for a connection, including the DC tasks.

It is noted that front end unit 102 and/or upper layer unit 106 may allow overbooking of connections beyond their processing power based on statistical measures. The scheduling in overbooked connections may be performed, for example, as described in U.S. patent application Ser. No. 08/969,981 filed Nov. 13, 1997, PCT application PCT/IL00/00733 filed Nov. 9, 2000 or in PCT application PCT/IL01/00132 filed Feb. 8, 2001, the disclosures of which are incorporated herein by reference. Specifically, by performing all the DC tasks in upper layer unit 106, rather than in a plurality of front end units 202, the overbooking rate which can be used is greater, as the variance decreases with the increase in the number of connections handled.

Alternatively or additionally to determining the task division responsive to the load on front end unit 102, the task division is determined responsive to the load on upper layer unit 106. The determination of the task division may be performed by a single unit (i.e., front end unit 102, upper layer unit 106, or a different unit) which then transmits instructions to the other unit(s) on the tasks they are to perform. Alternatively, the information on the load of the front end unit 102 and/or upper layer unit 106 is distributed between the units which determine the task distribution according to a predetermined protocol.

Alternatively or additionally to determining the task distribution responsive to the load on front end unit 102 and/or upper layer unit 106, the task distribution is determined responsive to the line quality of the connection on link 108, e.g., the jitter and/or delay of the link. For example, when the line quality of link 108 is high, preference is given to front end unit 102 performing EC tasks, while when the quality of link 108 is low preference is given to upper layer unit 106 performing the EC tasks. In some embodiments of the invention, the selection of whether to use a delivery confirming protocol is performed responsive to the quality of link 108.

Further alternatively or additionally, the distribution of the tasks is determined responsive to the quality of service (QoS) of the new connection. For example, high QoS connections may have the EC tasks performed at front end unit 102, closer to client modem 104, to allow faster retransmission of erroneous signals.

Further alternatively or additionally, the distribution of the tasks is performed responsive to user settings and/or responsive to one or more external attributes, such as the time of day, date, weather, etc. For example, statistics may be gathered on the use of client modems 104 in different areas at different times or seasons. Front end units 102 will optionally be set to perform minimal tasks at times in which peak usage is expected in their area. Possibly, when peak usage is expected throughout a region of an upper later unit 106, the distribution is planned to achieve a maximal total number of connections.

In some embodiments of the invention, when a client modem 104 requests establishment of a modem connection while front end unit 102 is entirely loaded, front end unit 102 negotiates with upper layer unit 106 the transfer of some of the tasks (e.g., EC tasks) of one or more of the handled connections to upper layer unit 106, to allow the connection of the new client modem.

In an exemplary embodiment of the invention, in the transfer of one or more tasks between the units, the EC flow control is used to stop the transmission of data on the connection for a short period. The handling of the data currently accumulated is completed and the handling of the one more tasks is transferred between front end unit 102 and upper layer unit 106. The EC flow control then resumes the data transmission. Alternatively or additionally, the transfer of one or more tasks is performed without stopping the transmission of data. Optionally, in transferring the handling of a task, a state record of the task is transmitted from the unit stopping to handle the task to the unit taking over the handling of the task.

Allowing dynamic distribution of the tasks between upper layer unit 106 and front end unit 102 allows achieving a higher utilization of the apparatus of system 100. On the other hand, using a fixed distribution of tasks may allow use of cheaper hardware and/or software for the apparatus of system 100.

Figure 2:
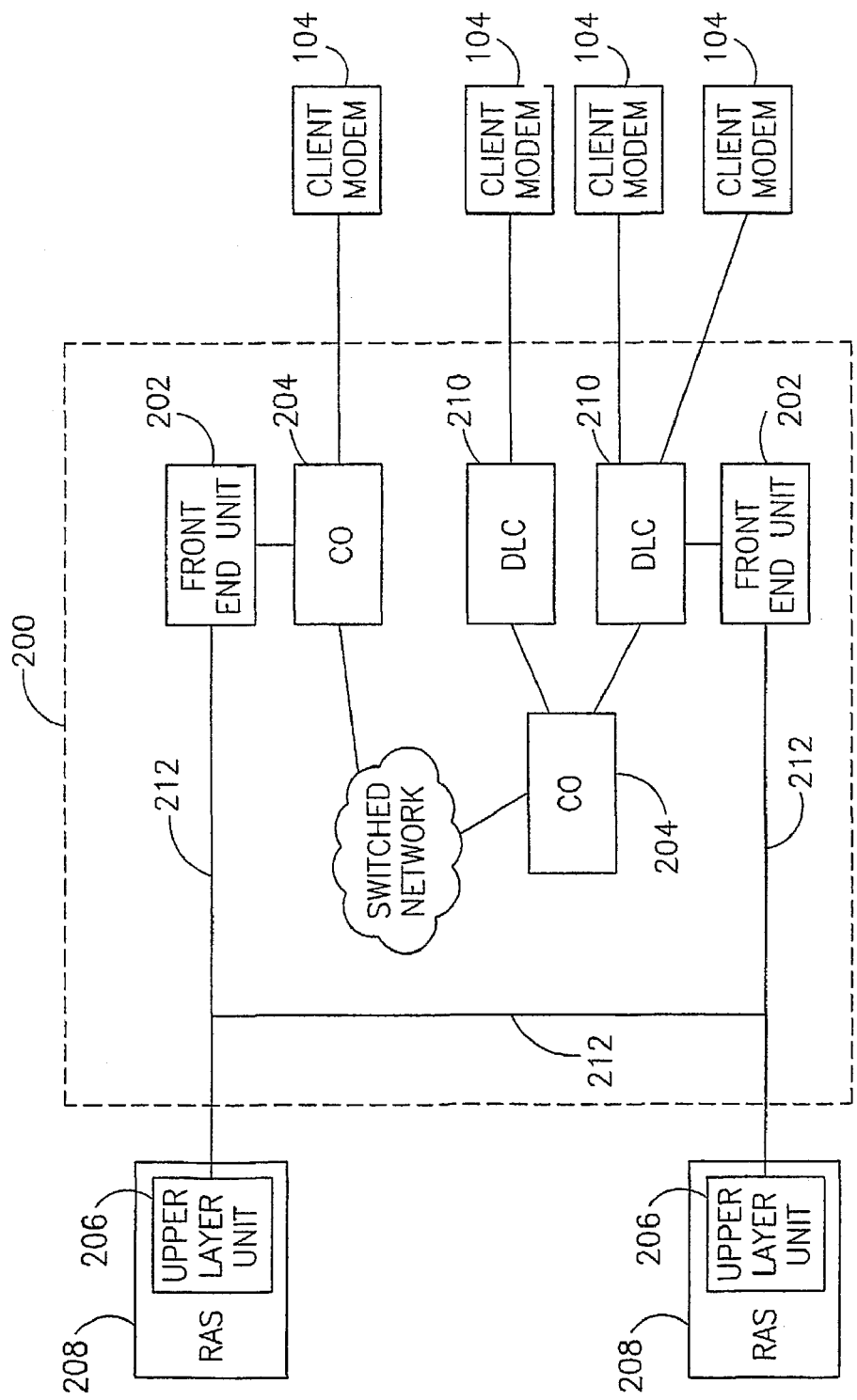
FIG. 2 is a schematic block diagram of a public switching telephone network (PSTN) with off-loading capabilities, in accordance with an embodiment of the present invention.

FIG. 2 is a schematic block diagram of a public switching telephone network (PSTN) 200 with off-loading capabilities, in accordance with an embodiment of the present invention. PSTN 200 comprises a plurality of frond end units 202 which are located close to client modems 104, e.g., adjacent digital loop carriers (DLCs) 210 and/or central offices 204. When a client modem 104 requests to establish a call with a modem RAS 208, for example of an ISP which supports off-loading, the call is identified by PSTN 200, e.g., by an adjacent CO 204 or DLC 210, and the call is routed through an adjacent front end unit 202. From front end unit 202, the call is directed over an off loading network 212 to an upper layer unit 206 of RAS 208 to which the call is directed. The RAS 208 to which the call is directed is optionally determined according to the dialed telephone number. Alternatively or additionally, any other off-loading method is used to determine which RAS 208 is to handle the connection. In some embodiments of the invention, the VBM connections handled by a single front end unit 202 may receive upper layer handling from a plurality of different upper layer units 206. Similarly, a single upper layer unit 206 may handle VBM connections which received front end handling from a plurality of different front end units 202.

Optionally, off-loading network 212 comprises a non-switched network, for example, a packet based network. Alternatively or additionally, off-loading network 212 comprises any other data link, for example a high bandwidth synchronous link.

The VBM tasks, which are to be performed in handling the connection with client modem 104, are divided between front end unit 202 and upper layer unit 206 in accordance with any of the static or dynamic divisions described above with reference to FIG. 1.

It is noted that, in these divisions, upper layer unit 206 of RAS 208 performs the entire PPP handling and front end unit 202 does not need to handle tasks of the PPP protocol. This simplifies the apparatus of front end unit 202. Furthermore, as the DC tasks are performed by upper layer unit 206, the signals passing on the link between front end unit 202 and upper layer unit 206 are already compressed and additional compression is not required. Thus, there is no need for front end unit 202 to perform an additional compression (e.g., L2TP compression) which is generally computation intensive.

In some embodiments of the invention, front end unit 202 is used, in addition to its use in off-loading, for modem over IP connections. Optionally, when a CO 204 of network 200 identifies that a call is directed to a remote modem or modem RAS, for example, which does not support off-loading, the call is off-loaded through a pair of front end units 202, so as to form a modem over IP (MoIP) connection. Alternatively or additionally, the MoIP connection is routed through two front end units 202 which are not connected through a switched network or at a time at which no switched lines are available.

The two front end units 202 along the path of the MoIP connection perform the same modem tasks. Optionally, when front end units 202 support dynamic division of tasks, at the establishment of a connection and/or when a retrain occurs, front end units 202 negotiate between them which tasks they are to perform. Alternatively, as described above tasks may be transferred between front end unit 202 and upper layer unit 206 during data transfer on the connection. In some embodiments of the invention, when front end units 202 participate in a MoIP connection they correlate between them the DP, EC and/or DC control signals which they transmit to their respective end modems. The control signal correlation may be performed as described in Israel patent applications 136,775, filed Jun. 14, 2000, 140,734, filed Jan. 4, 2001, or 140,952, filed Jan. 17, 2001, or in PCT application IL00/00492 filed Aug. 13 2000, the disclosures of which are incorporated herein by reference. Optionally, when a connection is established through front end unit 202, front end unit 202 is notified the type of the connection so that it determines whether control signal correlation is required for the connection and/or which type of correlation is required. Alternatively or additionally, front end unit 202 begins performing signal correlation for each established connection until or unless it is instructed otherwise by upper layer unit 206.

By using the same front end units 202 for both off-loading and MoIP connections, the costs of infrastructure required by network implementers are reduced.

Figure 3:
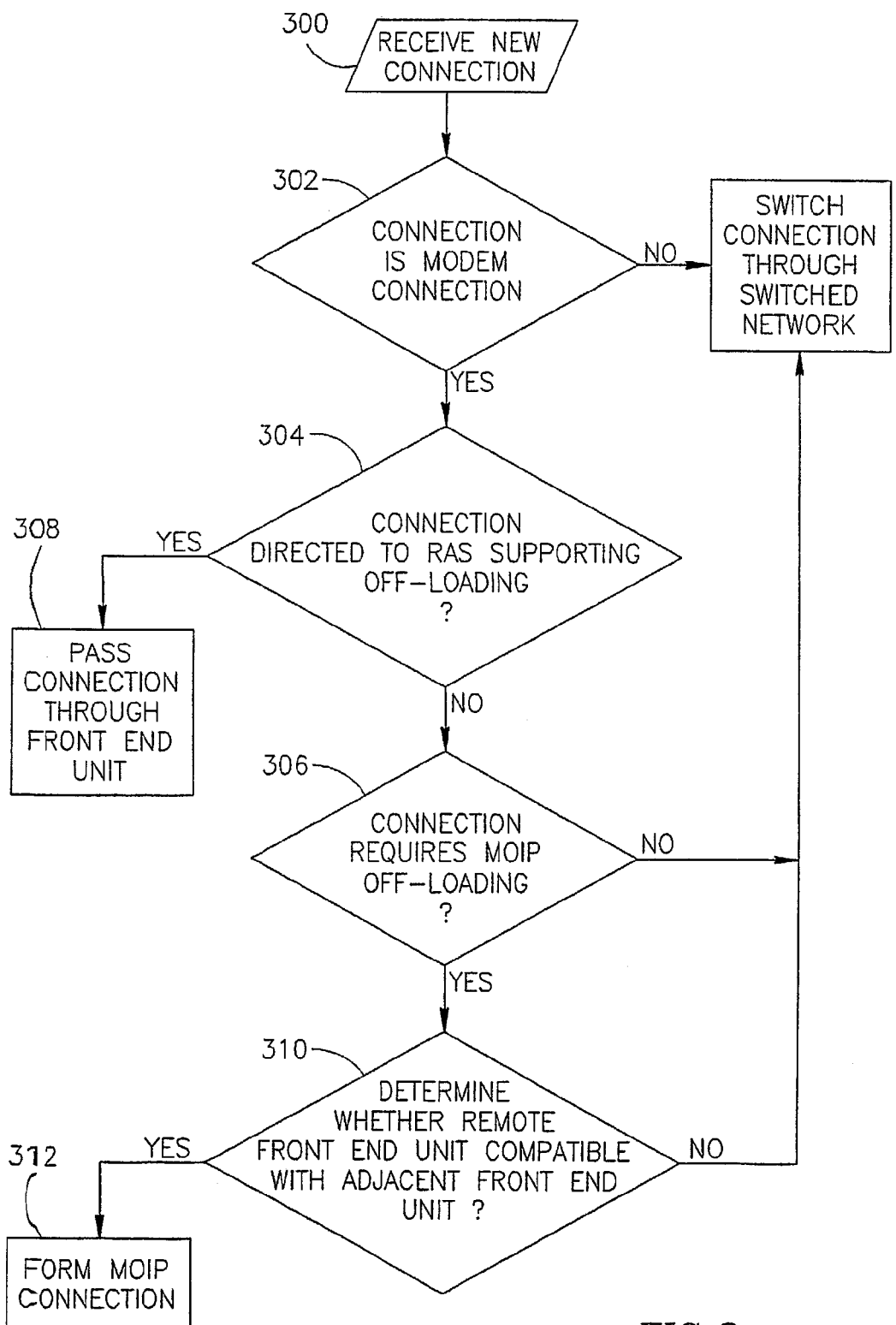
FIG. 3 is a flowchart of the acts performed by a central office (CO) in accepting a connection, in accordance with an embodiment of the present invention.

FIG. 3 is a flowchart of the acts performed by a CO 204 in accepting a connection, in accordance with an embodiment of the present invention. Upon receiving (300) a new connection, CO 204 determines (302) whether the connection is a modem connection. If the connection is a modem connection, CO 204 determines (304) whether the connection is directed to a RAS which supports off-loading, using any method known in the art, for example based on the phone number dialed. If the connection is directed to a RAS which supports off-loading, the connection is passed (308) through front end unit 202. If the connection is not directed to a RAS which supports off-loading, CO 204 determines (306) whether the connection is directed to a remote location which warrants the use of a MoIP connection. For example, local calls may be considered not requiring MoIP off-loading, while long distance calls may be considered as requiring MoIP off-loading.

If the connection requires MoIP off-loading, CO 204 determines (310) whether a remote front end unit 202, adjacent to the recipient of the modem connection, is compatible with the front end unit 202 adjacent CO 204. If the front end units are compatible, the connection is passed (312) through the adjacent front end unit 202 and the remote front end unit 202 to perform a MoIP connection.

Referring in more detail to determining (302) whether the connection is a modem connection, in some embodiments of the invention, in forming the connection, client modem 104 transmits a modem identification signal, e.g., a 2100 Hz signal, which notifies a modem on the other end that the connection is a modem connection. CO 204 identifies the modem identification signal and accordingly determines that the connection is a modem connection. Alternatively or additionally, the determination is based on the telephone number dialed which is included in a list of modem numbers.

In some embodiments of the invention, the connection is established using connection establishment procedures substantially as used for establishing voice over IP (VoIP) connections, for example, the procedures of the H.323 protocol and/or the session initiation protocol (SIP). In forming the connection, one or more packet connections are optionally established for communication between front end unit 202 and upper layer unit 206.

In some embodiments of the invention, front end units 202 handle all connections in substantially the same manner regardless of whether they are handling a MoIP connection or an off-loaded connection. Alternatively, the handling of at least some of the MoIP connections differs from the handling of off-loaded connections in the manner in which they generate control signals. For example, MoIP connections may correlate the rates of operation of the DP tasks of the connections from the font end units 202 to the end modems, while in off-loading connections such correlation is not performed.

It is noted that although the above description relates to distribution of the tasks of a RAS between two units, in some embodiments of the invention the tasks of the RAS are distributed between three or more units. For example, a front end unit 102 (FIG. 1) performs DP tasks, a regional unit 188 performs EC tasks and a central unit 106 performs DC tasks.

The above description relates to substantially any VBM connections including the V.34, V.22, V.32, V.32bis, V.90, V.91, V.92 ITU protocols. In addition, some of the principles of the present invention may be used with relation to other types of point to point modem connections.

Although the above description relates to communication with a client modem 104 which performs DC, EC and DP tasks, the present invention may be performed also with client modems which perform other sets of modem tasks, for example modems which perform only the EC and DP tasks. For example, a connection with a client modem 104 which performs only EC and DP tasks may be terminated by a front end unit which handles DP tasks and an upper layer unit which performs EC tasks.

It will be appreciated that the above described methods may be varied in many ways, including, performing a plurality of steps concurrently, changing the order of steps and changing the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of transmitting data bits over a modem connection, comprising:
receiving a first stream of data bits, by a first modem;
performing a first set of one or more modem tasks on the first stream of bits, by the first modem, so as to generate a second stream of bits;
modulating the second stream of bits, by the first modem, so as to form a modulated signal;
transmitting the modulated signal from the first modem to a front end unit of a responding system;
demodulating the modulated signal by the front end unit, so as to form a third stream of bits;
performing, by the front end unit, on the third stream of bits, a second set of zero or more modem tasks, including fewer tasks than the first set of tasks, so as to form a fourth stream of bits; and
transmitting the fourth stream of bits to an upper layer unit of the responding system, directly or through one or more additional units, over an addressable network.

2. A method according to claim 1, wherein performing the first set of tasks comprises performing data compression tasks and the second set of tasks does not include data compression tasks.

3. A method according to claim 2, wherein performing the data compression tasks comprises performing compression tasks in accordance with the V.42bis protocol, the V.44 protocol or the MNP5 protocol.

4. A method according to claim 1, wherein the first set of tasks does not include data compression tasks.

5. A method according to claim 1, wherein the second set of tasks does not include link access procedure for modem LAPM tasks.

6. A method according to claim 5, wherein the second set of tasks does not include high level data link control HDLC tasks.

7. A method according to claim 1, wherein the upper layer unit performs fewer than all the tasks included in the first set of tasks but not included in the second set of tasks.

8. A method according to claim 7, wherein the tasks included in the second set of zero or more modem tasks are selected dynamically for the modem connection.

9. A method according to claim 1, wherein the upper layer unit performs all the tasks included in the first set of tasks but not included in the second set of tasks.

10. A method according to claim 9, wherein the tasks included in the second set of zero or more modem tasks are selected dynamically for the modem connection.

11. A method according to claim 1, wherein the one or more additional units perform the second set of tasks on the fourth stream of bits so as to form a fifth stream of bits.

12. A method according to claim 11, comprising modulating the fifth stream of bits so as to form an additional modulated signal and transmitting the additional modulated signal to a third modem which performs the first set of tasks on the additional modulated signal.

13. A method according to claim 1, wherein transmitting the fourth stream of bits comprises transmitting over a packet based network.

14. A method according to claim 13, wherein transmitting the fourth stream of bits over a packet based network comprises transmitting over an IP network.

15. A method according to claim 13, wherein transmitting the fourth stream of bits over a packet based network comprises transmitting over an ATM network.

16. A method according to claim 13, wherein transmitting the fourth stream of bits over a packet based network comprises transmitting over a frame relay network.

17. A method according to claim 13, wherein the tasks included in the second set of zero or more modem tasks are selected dynamically for the modem connection.

18. A method according to claim 1, wherein the fourth stream of bits comprises at least one error correction field.

19. A method according to claim 1, wherein the fourth stream of bits comprises padding flags.

20. A method according to claim 1, wherein the upper layer unit is distanced from the front end unit by at least 100 meters.

21. A method according to claim 1, wherein the front end unit is included in an off-loading unit.

22. A method according to claim 1, comprising encrypting the fourth stream of bits before it is transmitted to the upper layer unit.

23. A method according to claim 1, comprising determining whether the fourth stream of bits is transmitted to the upper layer unit directly or through one or more additional units, responsive to the capabilities of the upper layer unit.

24. A method according to claim 23, wherein the determining is performed responsive to whether the upper layer unit supports off-loading.

25. A method according to claim 1, wherein at least one of the one or more additional units modulates the fourth stream of bits.

26. A method according to claim 1, wherein at least one of the one or more additional units performs error correction EC tasks on the fourth stream of bits and the upper layer unit performs data compression DC tasks on the fourth stream of bits.

27. A method according to claim 1, wherein the tasks included in the second set of zero or more modem tasks are selected dynamically for the modem connection.

28. A method according to claim 27, wherein the tasks included in the second set of zero or more modem tasks are selected dynamically responsive to the loads on the front end unit and the upper layer unit.

29. A remote access server comprising:
  a front end unit operable to perform one or more modem tasks, including a data pump task, on signals of one or more VBM connections;
  an upper layer unit operable to perform for each of the one or more connections, one or more modem tasks not performed by the front end unit for the respective connection; and
  a packet link operable to transfer signals of the one or more connections between the front end unit and the upper layer unit, encapsulated in packets.

30. A server according to claim 29, wherein the front end unit is adapted to perform a first set of one or more modem tasks on a first connection and a second set of one or more modem tasks, said second set being different from the first set, on a second connection.

31. A server according to claim 29, wherein the tasks performed by the front end unit for substantially all the one or more connections are the same.

32. A server according to claim 29, wherein the tasks performed by the front end unit and the upper layer unit for each of the connections include at least a data pump task, and an error correction EC task.

33. A server according to claim 32, wherein the tasks performed by the front end unit for a specific connection are selected dynamically for the modem connection.

34. A server according to claim 29, wherein the upper layer unit is adapted to perform a data compression task for at least one of the one or more connections.

35. A server according to claim 29, wherein the tasks performed by the front end unit for a specific connection are selected responsive to the load on the front end unit.

36. A server according to claim 29 wherein the tasks performed by the front end unit for a specific connection are selected responsive to the load on the upper layer unit.

37. A server according to claim 29, wherein the tasks performed by the front end unit for a specific connection are selected responsive to a quality measure of the addressable network.

38. A server according to claim 29, wherein the tasks performed by the front end unit for a specific connection are selected responsive to the time at which the specific connection is established.

39. A server according to claim 29, wherein the packet link comprises an addressable link.

40. A server according to claim 29, wherein the packet link comprises an IP link.

41. A server according to claim 29, wherein the upper layer unit is distanced from the front end unit by at least 100 meters.

42. A method of establishing a VBM connection, comprising:
  receiving a request, from a requesting modem, to form a VBM connection;
  determining a set of modem tasks to be performed by the requesting modem;
  selecting a front end unit of a responding server to perform one or more modem tasks, including a data pump task, on signals of the VBM connection;
  selecting an upper layer unit of the responding server, from a plurality of upper layer units which may operate with the selected front end unit, to perform one or more modem tasks not performed by the selected front end unit, on the signals of the VBM connection; and
  forming a connection between the requesting modem, the selected front end unit and the selected upper layer unit.

43. A method according to claim 42, wherein selecting the upper layer unit comprises selecting responsive to a telephone number dialed by the requesting modem.

44. A method according to claim 42, wherein forming the connection comprises establishing a packet based connection between the selected front end unit and the selected upper layer unit.

45. A method according to claim 44, wherein forming the connection comprises establishing a delivery confirming packet based connection between the selected front end unit and the selected upper layer unit.

46. A method according to claim 44, wherein forming the connection comprises establishing a non-confirming packet based connection between the selected front end unit and the selected upper layer unit.

47. A method according to claim 42, comprising instructing the front end unit which modem tasks to perform.

48. A method according to claim 47, wherein instructing the front end unit which modem tasks to perform comprises instructing responsive to the selected upper layer unit.

49. A method according to claim 47, wherein instructing the front end unit which modem tasks to perform comprises instructing responsive to the load on the selected front end unit.

50. A method according to claim 42, comprising instructing the upper layer unit which modem tasks to perform.

51. A method according to claim 50, wherein instructing the upper layer unit which modem tasks to perform comprises instructing responsive to the selected front end unit.

52. A method of transmitting data bits over a modem connection, comprising:
  receiving a first stream of data bits, by a first modem;
  performing a first set of one or more modem tasks on the first stream of bits, by the first modem, so as to generate a second stream of bits;

modulating the second stream of bits, by the first modem, so as to form a modulated signal;

transmitting the modulated signal from the first modem to a front end unit of a responding system;

demodulating the modulated signal by the front end unit, so as to form a third stream of bits;

performing, by the front end unit, on the third stream of bits, a second set of zero or more modem tasks, including fewer tasks than the first set of tasks, so as to form a fourth stream of bits;

encrypting the fourth stream of bits; and transmitting the encrypted fourth stream of bits to an upper layer unit of the responding system, directly or through one or more additional units.

53. A method according to claim 52, wherein the tasks included in the second set of zero or more modem tasks are selected dynamically for the modem connection.

54. A method according to claim 53, wherein the tasks included in the second set of zero or more modem tasks are selected dynamically responsive to the loads on the front end unit and the upper layer unit.

* * * * *